United States Patent Office 3,322,226
Patented May 30, 1967

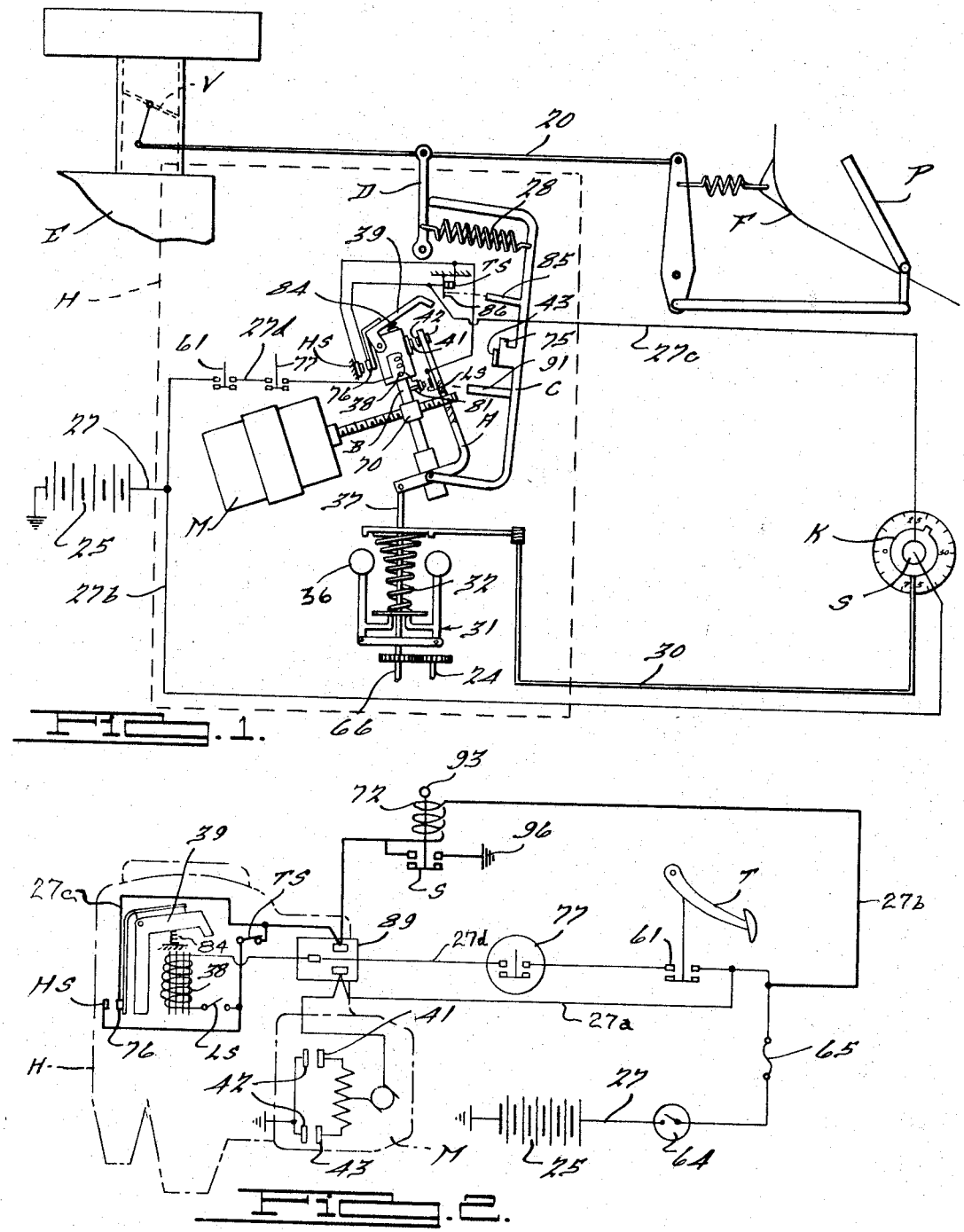

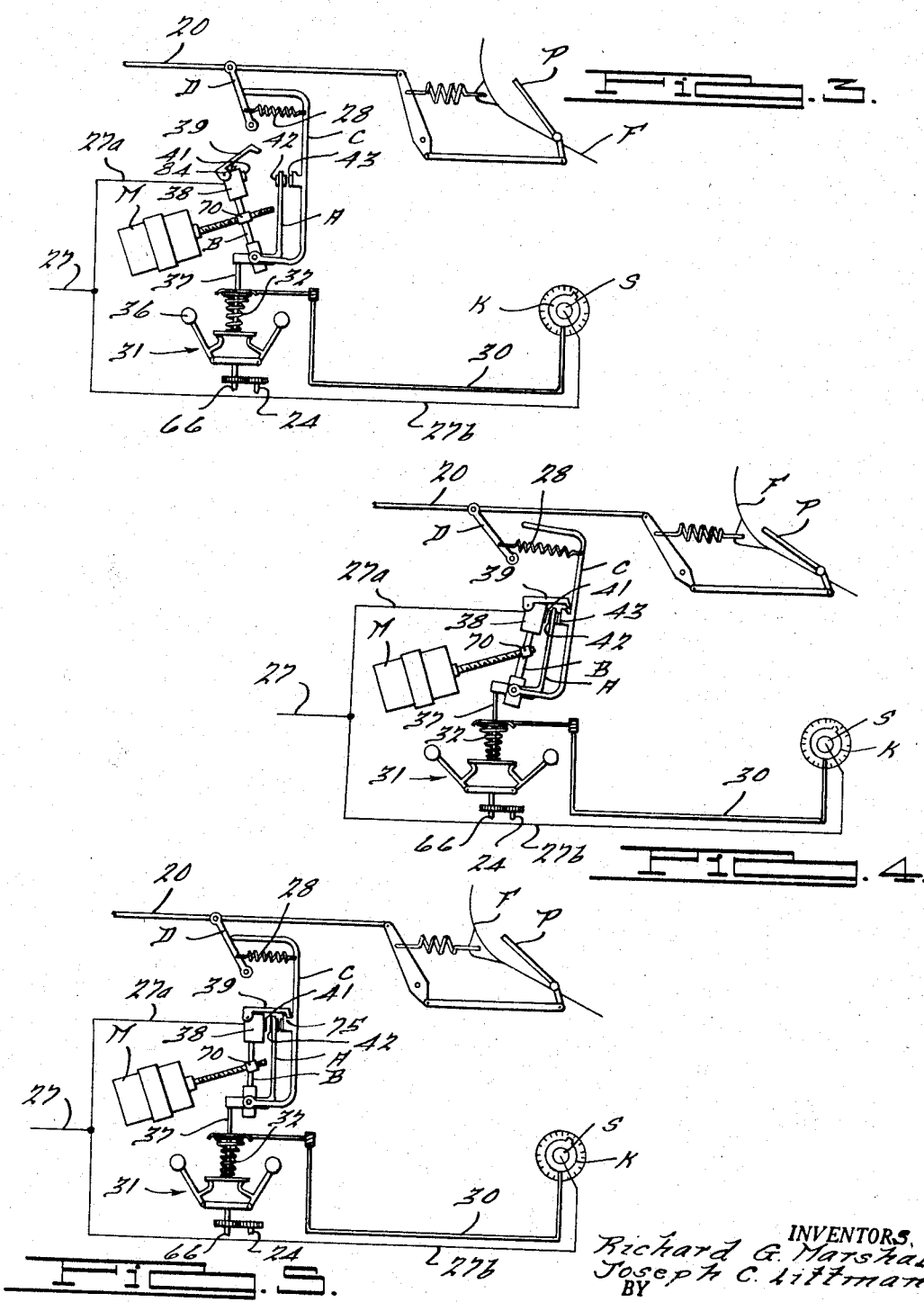

3,322,226
VEHICLE AUTOMATIC SPEED WARNING AND SPEED CONTROL DEVICE
Richard G. Marshall, Madison Heights, and Joseph C. Littmann, Grosse Pointe Woods, Mich., assignors to Chrysler Corporation, Highland Park, Mich., a corporation of Delaware
Filed Sept. 22, 1960, Ser. No. 57,751
11 Claims. (Cl. 180—106)

This invention relates to an improved control means for a motor vericle automatic speed control device and particularly to the control circut for automatically operating the speed control means when the vehicle speed has been brought up to the pre-selected speed at which automatic speed control is desired.

It is a primary object of this invention to provide a control circuit for a vehicle speed control device that will permit pre-selection of the vehicle speed at which a signal will advise the vehicle operator when the pre-selected speed has been reached and wherein means will thereupon automatically operate to activate the control system to maintain the vehicle at the pre-selected speed in the absence of operator effected overrule.

It is still another object of this invention to provide a control circiut for a vehicle speed control device that will cause automatic activation and operation of the vehicle speed controls when a pre-selected vehicle speed is achieved so that said pre-selected speed will thereafter be maintained in the absence of operator overrule.

It is still another object of this invention to provide a control means for a vehicle speed control device adapted to automatically operate to maintain a pre-selected vehicle speed once said vehicle speed is attained, unless overruled by the vehicle operator, with said automatic speed control means including means to render the automatically operable means imoperable at substantially wide open position of the vehicle engine throttle.

Other objects and advantages of this invention will become readily apparent from a reading of the following description and a consideration of the related drawings wherein:

FIG. 1 is a schematic view of the pertinent mechanical and electrical components of a speed control device embodying this invention, the view showing the components when the vehicle is at rest with the engine throttle valve closed;

FIG. 2 is a schematic wiring diagram of the electrical control system for this device, the heavy line portions of the diagram showing the additions that have been made to the prior system so that the automatic speed control action of the device would be automatically activated at the preselected speed rather than manually operated after attainment of the preselected speed as was the case heretofore;

FIG. 3 is a fragmentary schematic view, similar to FIG. 1, showing the mechanical elements of the speed control device when the vehicle has begun to move, but before it has attained the preselected dialed speed;

FIG. 4 is another fragmentary schematic view, similar to FIG. 1, but showing the mechanical elements of the speed control device in their speed warning positions when the vehicle speed is above the preselected dialed speed; and FIG. 5 is another fragmentary schematic view, similar to FIG. 3, but showing the mechanical elements of the speed control device when the vehicle speed is at the preselected dialed speed and the control system has been activated for automatic speed control.

This invention relates to the control system for vehicle speed control devices of the type shown generally in R. R. Teetor Patents 2,837,060 and 2,916,100. While these patents show speed control devices utilizing a pressure fluid operated motor means rather than an electrically operated motor means, still, the application of this invention to either type of speed control unit is thought to be obvious from the following description and the related drawings. It should be further pointed out that this invention relates to the automatically operable control circuit for the maintaining of a preselected speed rather than to the circuit means for just providing a speed warning device. Prior to the conception of this invention speed control devices of this type that included means for utilization of the control device as an automatic speed control required manual effort by the operator, after determination that the preselected control speed had been obtained in order to activate the control system for automatic speed control. This requirement for exercise of manual effort by the operator to activate the automatic speed control, after determination of the attainment of the preselected speed, meant that the operator had to take his eyes off the road after first determining that the vehicle had attained a speed equal to or above the preselected control speed and when such a speed condition existed to then take one hand off the steering wheel to manually operate the control switch that would bring the automatic speed control into operation. Each of these efforts required of the operator were objectionable from both a physical standpoint and a safety standpoint. The driver could not relax until after the automatic speed control had been placed in operation by manual switch movement and furthermore taking the operator's eyes off the road to operate the activating switch while driving with one hand was a definite accident hazard. As a result of this invention this type of speed control device functions in its normal manner to provide a speed warning unit and at the same time the device will operate automatically to provide an automatic speed control at any preselected speed without any additional operator effort, either physical, mental or visual. In addition, certain safety features are incorporated in this automatic speed control to prevent any unintended operation of the automatic control that might present a driving hazard during a fast acceleration start at wide open throttle operation.

Another advantage of this invention resides in the fact that it is accomplished by a novel but relatively simple circuitry addition to the control system that has been used heretofore for the speed control device that provided a manually activated automatic speed control. The simplicity of this circuitry addition to the prior control circuit is clearly brought out in FIG. 2 of the drawings wherein the prior circuit is shown in normal full lines whereas the circuitry addition involving this invention is shown in heavy lines. It is not the intent of this inventor to claim any of the structure that was utilized in the prior devices except so far as that structure forms a part of the new combination which includes the automatically operable automatic speed control.

One of the newest and most talked-about motor vehicle accessories is the throttle control device known as Auto-Pilot, a combination speed warning and speed control device available on Chrysler Corporation produced automobiles as optional equipment. The drawings, which are diagrammatic, are thought to clearly disclose this invention embodied in the Auto-Pilot device.

This speed control accessory, when used as a speed-warning device, helps make driving safer by reminding the driver that he has reached or exceeded his selected speed. Auto-Pilot's silent speed reminder consists of an increase in accelerator pedal pressure when the speed set on the manually operable control dial K is attained. Thus, the driver is relieved of having to look frequently at the speedometer and may keep his eyes on the road at all times.

In its second role—that of an automatic speed control—Auto-Pilot automatically varies the position of the accelerator P and associated carburetor throttle valve V just enough to maintain the selected car speed up and down hills, through flat country, or in the face of variable winds. Its completely automatic action relieves the driver of the fatiguing muscular tension often experienced on long journeys when the accelerator P must be held steady for extended lengths of time.

With Auto-Pilot, the driver can relax, since it is not necessary to keep his right foot fixed on the accelerator P. With both feet free, the driver may change his seating position slightly from time to time and delay the onset of the driving fatigue which can be so dangerous. This helps him to remain relaxed, alert, and better prepared to cope with any emergency that may arise.

In addition to these benefits, the Auto-Pilot has proved itself to be a fuel saver. In a 679-mile test trip from Detroit to New York to herald the introduction of this new device, a Chrysler Imperial equipped with Auto-Pilot achieved 15% better fuel economy than its otherwise identical running mate. The fuel saving was made possible by using Auto-Pilot as an automatic speed control throughout the trip, thereby reaping the benefits of its smooth, consistent operation.

Whether used as a speed warning device or an automatic speed control, Auto-Pilot makes a real contribution to driving safety. It does not force the driver to adopt any new or unusual driving habits, since it is designed to complement normal driving actions. It encourages drivers to observe legal speed limits and helps reduce accidents caused by driving strain on long trips. It is carefully constructed and fully safeguarded against malfunction, and it is very rugged in construction to assure long life.

When the driver wishes to use Auto-Pilot as a speed-warning device, he selects the desired speed by rotation of a control knob K on the vehicle instrument panel (see FIG. 1). When the speed of the car reaches this setting, the driver is alerted by an increase in the back pressure of the accelerator pedal P. In fact, the driver may easily maintain the dialed speed by holding his foot lightly against this "shelf" of higher resistance, allowing Auto-Pilot to change the accelerator pedal position automatically as required to maintain speed. If the driver desires to drive at another speed, he simply turns the control knob K to the new setting. If he sets it to a higher value, the accelerator pedal resistance returns to normal until the car speed matches the new speed setting. If he sets it for a lower speed, the accelerator pedal resistance comes in immediately and remains until he lets up on the accelerator and allows the car to slow down.

Normal control of the car is in no way affected by the Auto-Pilot. While driving at dialed speed, the accelerator P may be pressed to the floor F for passing power, and the only penalty will be the small added pedal resistance which warns the driver that he is exceeding the selected speed. Operation of the unit is such that no increase in pedal force is required to depress the accelerator when the car is below the dialed speed, even if the accelerator P is moved to the wide open position.

The nature of Auto-Pilot's speed warning is discreet, since it is felt at the logical location—the accelerator pedal itself. Speed warning is preferably provided throughout a range of 25 to 90 m.p.h. although this range can be varied.

When Auto-Pilot's second function—that of controlling the car's speed automatically—is desired, the driver preselects a speed with the dial control knob K and pulls out the switch button S that renders the automatic control operable. The driver then accelerates until added pressure is felt at the pedal P at which time the control circuit involving this invention automatically completes an electrical circuit (see FIG. 2) which locks the speed control unit to the accelerator linkage 20, causing the car to maintain almost constant speed until a new speed is dialed or until the Auto-Pilot is de-activated by depressing the brake pedal T (see FIG. 2). Once the control unit is locked to the accelerator linkage, the driver does not need to maintain any pressure on the accelerator pedal.

Auto-Pilot compensates for grade and wind to keep car speed within two or three miles per hour of the dial setting. If the driver wishes to speed up momentarily to pass another car, he simply depresses the accelerator pedal P until he completes his maneuver (the increased pedal force will be there to remind him that he is exceeding the speed setting). Afterwards, he lets up on the accelerator pedal P and allows the car to slow down to the desired driving speed.

Changes in speed may be made by dialing a new setting on the speed selector dial by the knob K. To drive faster, the driver depresses the accelerator P until he just exceeds the desired speed. Then the dial is turned to its new setting, and Auto-Pilot will maintain the car at that speed. It is also possible to change speed without touching the accelerator by turning the selector knob to another position. When dialing higher speeds, the selector knob should be turned slowly to provide moderate acceleration.

Auto-Pilot's automatic speed control encourages sound safety practices on the part of the driver. The desirable habit of having one foot poised over the brake pedal T (see FIG. 2) in readiness for slowing down is cultivated, for a light touch on the brake opens switch 61 and disengages the automatic speed control. Once the Auto-Pilot is disengaged and the car is decelerating, the foot is in exactly the right place for a quick brake application, if needed, or to flash the stoplights as a warning to the cars behind.

Compliance with posted maximum speeds is no problem in a car equipped with Auto-Pilot. Once the automatic control is engaged, the driver needs only to turn the speed-control knob to a reasonable speed. In many cases, the driver will find that his elapsed time for a given trip is less with Auto-Pilot, for the automatic control keeps the car at peak permissible speed, thereby maintaining the highest legal average possible for the journey.

Auto-Pilot is housed in a compact housing H (see FIG. 1) usually installed in the vehicle engine compartment. It is linked to the accelerator linkage 20 by the floating throttle arm link D. Auto-Pilot is connected to the speedometer through the governor drive cable 24 and to the transmission output shaft by the cable 66. The electrical components of this device (see FIG. 2) are connected to the battery 25 of the vehicle electrical system by the conductor 27 that includes the ignition switch 64 and a suitable fuse 65.

Projecting from the housing H are two arms C and D. One of these, the latching arm lever C, is fixed to a shaft extending inside the control housing. The other lever D is a floating throttle arm connected to the accelerator linkage 20 and attached to the latching arm lever C by means of a tension spring 28 which, when extended, exerts the warning force on the accelerator pedal P which the driver feels when he exceeds his preset speed.

Included in the housing H is a reversible, high-torque electric motor M which provides the power required to extend the tension spring 28 or to actuate the throttle linkage 20 when automatic speed control is selected. A cable 66 which is turned by the output shaft in the transmission is connected to drive both the speedometer and the governor 31. A cable 30 controls the stress in the spring 32 of governor 31. This cable 30 is connected to and actuated by the speed selector knob K on the instrument panel by mechanism such that the compressive stress in the spring 32 of governor 31 may be varied.

The Auto-Pilot electric motor M actuates linkages B, C, D, that are associated with the accelerator pedal linkage 20. The electrical contacts 41, 42, 43, which energize this motor M, are opened or closed by the movement of the spring-loaded flyball governor 31 and its connected linkage 37. The governor 31, which is driven by the cable 66 from the transmission is connected by spur gears to rotate the speedometer cable 24 at exactly the same speed. It will be noted that the governor 31 is connected by linkage 37 to the switch arm A carrying the double contacts 42 to provide for vehicle speed responsive control of motor M.

The Auto-Pilot is turned on with the ignition switch 64 (see FIG. 2); it is active and ready to use as a speed warning or automatic speed control whenever the car is in use. If the driver does not wish to use Auto-Pilot he can turn the dial knob K (FIG. 1) to its maximum speed setting and the car will operate without the speed warning feature. Auto-Pilot's operation is best understood if a sequence of events is explained beginning with the car at idle speed condition and proceeding up to the desired operating speed condition.

FIG. 1 is a schematic drawing of the elements of the Auto-Pilot and their relative positions when the car is not moving. The governor 31 is not rotating, and the pressure of the governor spring 32 holds the weights 36 at a minimum radius position. The link 37 connecting the weights 36 and contact arm A holds the arm A over to the left. The arm B containing the electro-magnet 38 and latch 39 has previously been pulled over to the left by the tmotor M, and a large gap separates the contact points 43, 42 on the latching arm C and the contact arm A, respectively. Since all motor contact points are open, the motor M does not turn, and the Auto-Pilot is inactive.

As the accelerator pedal P is depressed, the throttle linkage 20 moves arm C to the left towards arms A and B through the spring 28. No electrical contact will be made between the contacts 41, 42, 43, on arms A, B and C until the car is moving, for even though arm C might be pushed against arm A by the throttle linkage 20, built-in clearances keep the points 42, 43 apart.

When the car starts to move, the governor 31 turns. The governor weights 36 exert their centrifugal force against the restraint of the preset governor control spring 32, and when the car nears the set speed, the force of the whirling weights 36 equals the preset force of spring 32 and the weights 36 begin to move outward.

The outward movement of the governor weights 36 elevates the link 37 and causes arm A to move to the right as shown in FIG. 3 and one of its contact points 42 soon touches the contact 43 on arm C. The closing of contacts 42, 43, causes electric motor M to activate the screw and nut 70 to advance arm B until portions thereof bear up against arm C and push arm C to the right (see FIG. 4). This rightward movement of arm C by motor M when the accelerator operated linkage 20 is moving link D to the left causes an extension of the tension spring 28 and provides an abrupt increase in force opposing further depression of the accelerator pedal P. This is the force which warns the driver that he is above his dialed speed and provides the aforementioned speed warning device.

If the driver heeds the warning he discontinues further accelerator depression and his car stops accelerating and the governor 31 holds arm A steady. The points 42, 43 then break their contact and the motor M stops. At this juncture (see FIG. 5), arm A is somewhere midway between arms B and C and the few thousandths of an inch clearance between the two sets of contact points 41, 42 and 42, 43 keeps them from energizing the motor M. If, on the other hand, the driver chooses to keep accelerating above the speed at which the warning pressure is felt, continued accelerator depression will cause the motor M to continue to push arm C to the right, increasing the the extension of the spring 28 to further increase the speed warning force.

FIG. 4 shows the relative positions of the parts when vehicle speed is above the dialed speed setting of the Auto-Pilot. It will be noted that the spring 28 has been stretched so that it loads the accelerator linkage 20 and tends to shift the accelerator P towards closed throttle position to thereby reduce car speed.

When the car's speed drops below the dialed speed, the set of contact points 41, 42 at the left side of arm A comes into play. Refer again to FIG. 4 and imagine that the car has been moving at the dialed speed (no contact between points 41, 42, 43) but starts to climb a hill and begins to slow down. To maintain speed, the throttle valve V (FIG. 1) must be opened. As car speed begins to drop, the governor 31 slows down and arm A will move to the left against arm B closing contacts 41, 42 and causing the electric motor M to reverse and pull arm B to the left. This relieves the pressure of spring 28 on arm C, which follows along to the left in response to the pressure of the driver's foot on the accelerator P. This of course allows the engine E to accelerate the car toward a higher speed. Arm A is then moved away from arm B by the action of the governor 31 and the motor M stops.

Thus, every time the car's speed rises above dialed speed, Auto-Pilot intercedes by increasing accelerator resistance through stretched spring 28. And whenever the speed drops below the dialed speed setting, Auto-Pilot relaxes its warning spring pressure. By responding to these changes, the driver may thus maintain his speed within two of three miles per hour of the desired value.

However, it is thought to be obvious that whenever the driver wishes to go faster than his dial setting, he merely has to depress the accelerator P as far as he wants. Auto-Pilot will then maintain its extra back pressure on the accelerator P to remind him that he is exceeding his desired speed.

Auto-Pilot's second function — that of automatically controlling the speed of the car—is an extension of its automatic speed warning role. It is the circuit for the automatic speed control that involves this invention. The same elements previously described as regards the speed warning mechanism are used in the automatic speed control, but one additional part, the latch 39, and its control circuit, come into play. The latch 39 is engaged automatically at the preselected vehicle speed if the button S in the center of the Auto-Pilot control knob K has been pulled out to activate the automatic speed control circuit.

From FIGS. 1, 2 and 5 it will be noted that the arm B carries an electro-magnet 38 that is arranged to rotate the latch arm 39 clockwise on energization of the magnet 38. Latch 39 is arranged to be engaged with the keeper 75 carried by arm C when the automatic speed control is in operation. This ties arm B to arm C as shown in FIG. 5. Latch 39 also carries a movable switch contact 76 that forms a part of the latch holding switch HS. When latch 39 (see FIG. 5) is engaged with keeper 75 then holding switch HS is closed. The function of the holding switch will be subsequently explained.

Tht latching switch LS (see FIGS. 1 and 2) for effecting engagement of latch 39 with keeper 75 is built into the Auto-Pilot mechanism to prevent the latch 39 from being pulled down when arms B and C are not sufficiently close together. It is a normally-open switch in series with the button switch S, the wide open throttle switch TS, the magnet 38 and brake operated switches 77, 61. Latching switch LS is closed mechaniscally (see FIG. 1) by an extension 91 on arm C.

Using the foregoing discussion of Auto-Pilot's speed warning function as a basis, it can be visualized that as long as the latch 39 is engaged with keeper 75 arm C will follow every movement of arm B, and the accelerator pedal P will move up or down to open or close the throttle valve V every time the electric motor turns one way or the other.

As the car travels down the road at constant speed, the contact points 42, 42 on arm A will be between the points 41, 43 on arms B and C, and the small clearances between them will prevent the motor M from turning. If, however, the car slows down, arm A will move to the left very slightly closing contacts 41, 42 and the motor M will turn to pull arms B and C to the left until the points 41, 42 break contact again. This opens the throttle valve V just enough to compensate for the loss in speed. If the car speeds up, arm A will move to the right, causing the point 42 to contact the point 43 on arm C and causing the motor M to push the arms A, C rightwardly to close the throttle valve V slightly.

When the driver wishes to slow down, he needs only to touch the foot brake T, and the mechanical and hydraulic brake switches 61, 77 in the control circuit open and cut off the current to the magnet 38, releasing the latch 39 and disengaging the Auto-Pilot. If the braking caused the vehicle speed to drop below the preselected control speed then the governor closed latching switch LS was opened and it will remain open until the vehicle is again brought up to speed at which time switch LS will close and the automatic speed control will be automatically brought back into operation without any switch manipulation by the driver.

Like the mechanical components of the Chrysler Auto-Pilot, the electrical system has been engineered to make the unit as safe and as trouble-free as humanly possible. Every part of the electrical system has been designed so that any interruption of the current will cause Auto-Pilot to disengage itself, returning the car to normal operation. A broken circuit, a loose wire, a blown fuse—even shutting off the ignition—will shut off the Auto-Pilot and return the accelerator to conventional driver operation. Failure of the Auto-Pilot electrical system cannot cause disturbance that would render the car unsafe or uncontrollable.

FIG. 2 shows Auto-Pilot's electrical circuit in schematic form. Current from the battery 25 goes to the ignition switch 64, through a 10-ampere fuse 65 located behind the vehicle instrument panel, and thence through the series arranged brake switches 61, 77 to the connector plate 89 on the Auto-Pilot housing H. In this external circuit, there are two switches which positively disengage the Auto-Pilot. The first one is a normally-closed mechanical switch 61 which is opened by a slight push on the brake pedal. The mechanical switch is built so that the contact points are pulled apart when the brake pedal is depressed. Thus, the assembly is fail-safe even though the points may tend to stick together.

In the event that the mechanical disengaging switch fails, a hydraulic safety switch 77, actuated by the brake applying fluid pressure, opens to disengage the Auto-Pilot. The safety switch 77 is actuated when the brakes are firmly applied and relatively high hydraulic pressure is produced. If the operation of this switch 77 is required to disengage the Auto-Pilot, the driver is warned that he should refrain from using the automatic speed control until the mechanical disengaging switch 61 is replaced.

The pull button in the center of the control knob K actuates a normally-open switch S which must be closed manually to complete the latching circuit for the latch bolt 39 so as to establish the automatic speed control. It should be emphasized at this point that the pull switch S can be operated to condition the system for automatic speed control at the same time that the control speed is dialed so that driver manipulation of the switch S is not required while the vehicle is in motion. This is an important improvement over the prior systems wherein some control had to be driver operated at the time of or after the dialed speed had been attained in order to bring into operation the automatic speed control function. It should be understood, however, that the switch S can be closed at any time to bring the automatic speed control into operation and that the actual automatic control of the speed will not take place until the vehicle speed is at or above the dialed speed. The latching switch LS is in series with the pull switch S, and Auto-Pilot's latch 39 cannot engage the keeper 75 without these two switches being closed and in proper working order. The latching magnet 38 is positive in action, and it "fails safe." That is, if the current through the magnet 38 is interrupted for any reason, the latch 39 will be moved to open position by the spring 84. Even if the latch spring should fail, the angle machined on the mating surfaces of the latch 39 and keeper 75 will cause the latch 39 to slip out of engagement with keeper 75. The latch holding switch LS also is designed with safety in mind, for if it fails to close properly, Auto-Pilot will disengage.

Another safety feature that is included in this automatically operable speed control unit involves the throttle switch TS. This switch is normally closed and is only opened at substantially wide open throttle position of the throttle valve V. The purpose of this switch is to prevent unintended engagement of the automatic speed control during a high acceleration start where the accelerator P might be initially floored and the vehicle suddenly brought up to a speed that would be above the dialed control speed. If the pull switch S for activating the automatic speed control had been closed before the vehicle reached the dialed speed, during the fast start acceleration, then the electrical control system would have, in the absence of throttle switch TS, provided a closed circuit for the electro-magnet 38 and would have effected an engagement of the latch 39 with the keeper 75. This would then lock-in and maintain the dialed speed even though the accelerator pedal P were released. It could be that the driver woud not desire a lock-in of the dialed speed during a fast start acceleration and for that reason the wide open throttle switch TS has been incorporated in the automatic speed control operating circuit.

Looking at FIG. 1, it will be noted that arm C carries an extension 85 that will be carried leftward by the accelerator linkage 20 during a fast start acceleration. If the accelerator P is floored to substantially wide open throttle position during such a start then the extension 85 engages the flexible leaf spring mounting arm 86 for one of the contacts of the throttle switch TS and opens the circuit controlling the energization of the electro-magnet 38. FIG. 2 shows in heavy lines the automatic speed control circuit and it is thought to be obvious from this diagram that opening of either the latching switch LS or the wide open throttle switch TS will prevent energization of the electro-magnet 38. Even though a fast start may cause the control arms A and C to be swung leftward to effect a closing of latching switch LS, still, the projection 85 on arm C will open switch TS before closing of switch LS if a substantially wide open throttle accelerator position is developed during the fast start. If switch TS is opened the circuit for effecting latching of bar 39 to keeper 75 for automatic speed control will not be energized. The wide open throttle switch TS thus prevents loss of driver control of the throttle valve V during a fast start acceleration and it reserves the automatic speed control operation for cruising where its benefits are desired and most pronounced.

Looking at FIG. 2, it will be noted that to bring the automatic speed control into operation at some preselected speed already established by the operation of the control knob K (see FIG. 1) it is merely necessary to pull out the button 93 to close the switch S. This will energize the coil 72 and hold switch S closed because a ground is now provided at 96. On starting drive of the vehicle the throttle switch TS is normally closed but the latching switch LS and the holding switch HS are both normally open. As latching switch LS is normally open the circuit for magnet 38 is open and the latch bar 39 will be in an elevated or disengaged position as shown in FIGS. 1–3. As the vehicle speed is increased the governor 31 will actuate the arm A and at the same time there will be movement of arms B and C as previously explained with regard to FIGS. 3–5. When the vehicle speed has attained the speed set on the control dial by the knob K then the arms A, B and C will be so positioned that the latching switch LS will be closed. The various arms A, B and C will be positioned as shown in FIG. 5 and at such a time the projection 91 (see FIG. 1) on arm C will engage and close the latching switch LS. The throttle switch TS will also be closed, except at a wide open throttle position so the magnet 38 will now be energized and the latch bar 39 engaged with the keeper 75 to provide for automatic speed control at the preselected speed. The automatically controlled speed can be overridden by accelerator depression which will merely stretch the spring 28 and provide increased resistance to accelerator depression. On release of the accelerator P from its overriding depressed position the accelerator linkage will return to the position at which the preselected speed will be maintained. It will be noted that because the latch arm 39 carries the movable contact 76 of the latch holding switch HS this switch is closed when the latching magnet 38 is energized. Thus a parallel circuit for maintaining energization of the magnet 38 is provided that bypasses the throttle switch TS and prevents loss of the automatic speed control even though the accelerator P might be fully depressed so as to open throttle switch TS. Once the automatic speed control is established by attaining the preselected speed after closing of switch S then this speed is maintained except when braking is required or there is driver action to disestablish the automatic speed control.

From FIG. 2 it is obvious that applying the vehicle brakes by depression of pedal T will open one or both of normally closed brake switches 61 and 77 and deenergize the magnet 38. This will destroy the automatic speed control by release of the latch bar 39 and by opening of the speed responsive latch holding switch LS provided the speed was decreased during braking. However, on release of the brakes and accelerator depression to again bring the vehicle speed up to the preselected speed, the latching switch LS will be automatically closed and the automatic speed control will again be automatically re-established.

From the foregoing it is thought to be clear that by the addition of the heavy line circuitry shown in FIG. 2 to the speed warning control circuitry provided heretofore and shown in light lines in FIG. 2, it is possible to provide an automatic speed control device that will be automatically brought into operation on attainment of the preselected speed. Also, by the addition of the throttle switch TS to the automatic speed control circuitry shown in heavy lines in FIG. 2 an important improvement that provides a safety device has been incorporated in this automatic speed control device.

FIGS. 1 and 2 are thought to clearly bring out the relatively simple circuitry for this speed control device. The battery 25 has a conductor 27 that goes through the ignition switch 64 and a safety fuse 65 after which it brances off into parallel conductors 27a, 27b, 27c and 27d. The branch line 27a is essentially used to control the motor M for speed warning functions. The addition of branch lines 27b, 27c and 27d and their associated switches provides the means for obtaining the automatically activated automatic speed control.

We claim:

1. A device for controlling the speed of an automotive vehicle having a driver-operated throttle control member, said device comprising power-operated means responsive to vehicle speed for establishing a resistance to advancing movement of said control member at a predetermined vehicle speed, means activable to drivingly interconnect said driver-operated throttle control member and said power-operated means with said power-operated means thereby being operable to advance and retard said control member when the vehicle speed is below and above said predetermined speed respectively whereby said power-operated means constitutes an automatic control of the speed of the vehicle and maintains it at said predetermined speed, and driver-operated means for rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said means for activating said automatic control means comprising a manually operable switch means and a vehicle speed responsive switch means arranged in series and connected to a power source.

2. A device for controlling the speed of an automotive vehicle having a driver-operated throttle control member, said device comprising power-operated means responsive to vehicle speed for establishing a resistance to advancing movement of said control member at a predetermined vehicle speed, means activable to drivingly interconnect said driver-operated throttle control member and said power-operated means with said power-operated means thereby being operable to advance and retard said control member when the vehicle speed is below and above said predetermined speed respectively whereby said power-operated means constitutes an automatic control of the speed of the vehicle and maintains it at said predetermined speed, and driver-operated means for rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power operated means comprising an electric motor with a power source and the control circuit therefor including a manually operable electric switch and a vehicle speed responsive electric switch arranged in series and connected to an electrical energy power source.

3. A device for controlling the speed of an automotive vehicle having a driver-operated throttle control member, said device comprising power-operated means responsive to vehicle speed for establishing a resistance to advancing movement of said control member at a predetermined vehicle speed, means activable to drivingly interconnect said driver-operated throttle control member and said power-operated means with said power-operated means thereby being operable to advance and retard said control member when the vehicle speed is below and above said predetermined speed respectively whereby said power-operated means constitutes an automatic control of the speed of the vehicle and maintains it at said predetermined speed, and driver-operated means for rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power operated means comprising an electric motor with a power source and control circuit therefor, said driver operated means for establishing said automatic control of said vehicle speed comprising a driver controlled electrical circuit that includes a manually operable switch, and a vehicle speed responsive switch arranged in series therewith.

4. A device for controlling the speed of an automotive vehicle having a driver-operated throttle control member, said device comprising power-operated means responsive to vehicle speed for establishing a resistance to advancing movement of said control member at a predetermined vehicle speed, means activable to drivingly interconnect said driver-operated throttle control member and said power-operated means with said power-operated means thereby being operable to advance and retard said control member when the vehicle speed is below and above said predetermined speed respectively whereby said power-operated means constitutes an automatic control of the speed of the vehicle and maintains it at said predetermined speed, and driver-operated means for rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power-operated means also maintaining said resistance when the driver overrides said automatic control by holding said control member at a position to effect operation of the vehicle at a speed above said predetermined speed, the control circuit for said power-operated means including a manually operable electric switch and a vehicle speed responsive electric switch arranged in series and connected to an electrical energy power source.

5. A device for controlling the speed of an automotive vehicle having a driver-operated throttle control member, said device comprising power-operated means responsive to vehicle speed for establishing a resistance to advancing movement of said control member at a predetermined vehicle speed, means activable to drivingly interconnect said driver-operated throttle control member and said power-operated means with said power-operated means thereby being operable to advance and retard said control member when the vehicle speed is below and above said predetermined speed respectively whereby said power-operated means constitutes an automatic control of the speed of the vehicle and maintains it at said predetermined speed, and driver-operated means for rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed except when said throttle control member is at substantially wide open throttle position and means activated when the the throttle control member is moved to wide open throttle position to render said automatic control inoperable, the control circuit for said power-operated means including a manually operable electric switch and a vehicle speed responsive electric switch arranged in series and connected to an electrical energy power source.

6. In a device for controlling the speed of an automotive vehicle comprising a driver-operated throttle control member, power-operated means responsive to vehicle speed for establishing a resistance to advancing movement of said control member at a predetermined vehicle speed to provide a speed warning device, means activable to drivingly interconnect said driver-operated throttle control member and said power-operated means with said power-operated means thereby being operable to effect advancing and retarding movement of said throttle control member when the vehicle speed is below or above said predetermined speed respectively whereby said power-operated means constitutes an automatic control of the speed of the vehicle and maintains the vehicle at said predetermined speed, and driver-operated means for selectively rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power-operated means comprising an electric motor, and an electrical circuit for controlling said motor comprising first vehicle speed responsive switch means to control reversible operation of said motor, and a parallelly arranged electrical circuit having a second vehicle speed responsive switch means and a driver-operable switch means arranged in series to control movement of said throttle control member by said electric motor.

7. In a device for controlling the speed of an automotive vehicle comprising a driver-operated throttle control member, power-operated means responsive to vehicle speed for establishing a resistance to advancing movement of said control member at a predetermined vehicle speed to provide a speed warning device, means activable to drivingly interconnect said driver-operated throttle control member and said power-operated means with said power-operated means thereby being operable to effect advancing and retarding movement of said throttle control member when the vehicle speed is below or above said predetermined speed respectively whereby said power-operated means constitutes an automatic control of the speed of the vehicle and maintains the vehicle at said predetermined speed, and driver-operated means for selectively rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power-operated means comprising an electric motor, and an electrical circuit for controlling said motor comprising first vehicle speed responsive switch means to control reversible operation of said motor, and a parallelly arranged electrical circuit having a second vehicle speed responsive switch means, a switch means operable by said throttle control member at substantially wide oven throttle position, and a driver operable switch means arranged in series to control movement of said throttle control member by said electric motor.

8. In a device for controlling the speed of an automotive vehicle comprising a driver-operated throttle control member, power-operated means responsive to vehicle speed for establishing a resistance to advancing movement of said control member at a predetermined vehicle speed to provide a speed warning device, means activable to drivingly interconnect said driver-operated throttle control member and said power-operated means with said power-operated means thereby being operable to effect advancing and retarding movement of said throttle control member when the vehicle speed is below or above said predetermined speed respectively whereby said power-operated means constitutes an automatic control of the speed of the vehicle and maintains the vehicle at said predetermined speed, and driver-operated means for selectively rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power-operated means comprising an electric motor, and an electrical circuit for controlling said motor comprising first vehicle speed responsive switch means to control reversible operation of said motor, and a parallelly arranged electrical circuit having a second vehicle speed responsive switch means, a switch means operable by said throttle control member at substantially wide open throttle position, and driver operable switch means to control movement of said throttle control member by said electric motor, said throttle control operable switch means being normally closed and opened only at substantially wide open throttle position.

9. In a device for controlling the speed of an automotive vehicle comprising a driver-operated throttle control member, power-operated means responsive to vehicle speed for establishing a resistance to advancing movement of said control member at a predetermined vehicle speed to provide a speed warning device, means activable to drivingly interconnect said driver-operated throttle control member and said power-operated means with said power-operated means thereby being operable to effect advancing and retarding movement of said throttle control member when the vehicle speed is below or above said predetermined speed respectively whereby said power-operated means constitutes an automatic control of the speed of the vehicle and maintains the vehicle at said predetermined speed, and driver-operated means for selectively rendering said power-operated means inoperable to actuate said control member and thereby disabling said automatic control with said power-operated means remaining operable for establishing said resistance at said predetermined speed, said driver operable means for establishing said automatic control of said vehicle speed including a control circuit with driver-operated means capable of activation at any speed below said predetermined speed so that said automatic control of said vehicle speed will be automatically established and maintained, in the absence of driver override, whenever the vehicle attains the predetermined speed, said power-operated means comprising an electric motor, and an electrical circuit for controlling said motor comprising first vehicle speed responsive switch means to control reversible operation of said motor, and a parallelly arranged electrical circuit having a second vehicle speed responsive switch means, a switch means operable by said throttle control member at substantially wide open throttle position, and driver operable switch means arranged in series to control movement of said throttle control operable switch means being normally closed and opened only at substantially wide open throttle position, and said driver operable switch means being normally open and providing, when closed, a continuous ground for a circuit including said second speed responsive switch means and said throttle control member operable switch means.

10. In a speed control device for a vehicle having a throttle control member and a driver-operated brake, said device being adapted to maintain the vehicle at a substantially constant predetermined speed and including an operating member adapted to be connected to the throttle control member, an actuating member movable in opposite directions in response to changes in the speed of the vehicle from said predetermined speed, said actuating member being engageable with said operating member, and means for coupling said actuating member to said operating member, the combination of means for actuating said coupling means to effect coupling of said operating and actuating members, and control means for said actuating means including manually operable means operable, when set, for rendering said actuating means effective, said control means also including means for preventing actuation of said coupling means when said throttle control member and said operating member are moved to a full open throttle position and said operating and actuating members are in coupling position, and brake operated means operable, when the brake is operated, for preventing said actuating means from being rendered effective by said manually operable means, said manually operable means when set being effective to automatically render said actuating means operable whenever said brake is released.

11. In a speed control device for an engine driven vehicle having an engine throttle control member, said device being adapted to maintain the vehicle at a substantially constant predetermined operating speed and including an operating means adapted to be connected to the engine throttle control member, an actuating means movable in opposite directions in response to changes in the speed of the vehicle, and means for coupling said actuating means to said operating means including an electromagnet for operating said coupling means, and a circuit for energizing said electromagnet, said circuit comprising a source of electrical energy, a first switch operable by said operating means and adapted to be closed during coupled engagement of said operating means and said actuating means, and a second manually operable switch in said circuit having electrically actuated means energized upon closing of said second switch to render said circuit operable for automatiaclly maintaining the vehicle at said substantially constant predetermined speed.

References Cited
UNITED STATES PATENTS

| | | | |
|---|---|---|---|
| 2,755,877 | 7/1956 | Kelem | 180—82.1 |
| 2,897,906 | 8/1959 | Brueder | 180—82.1 |
| 2,911,077 | 11/1959 | Carter. | |
| 2,966,224 | 12/1960 | Teetor | 180—82.1 |
| 2,971,596 | 2/1961 | Davis et al. | 180—82.1 |
| 2,972,390 | 2/1961 | Bunker et al. | 180—82.1 |
| 2,972,391 | 2/1961 | Faiver et al. | 180—82.1 |
| 2,973,051 | 2/1961 | Teetor | 180—82.1 |

KENNETH H. BETTS, *Primary Examiner.*

PHILIP ARNOLD, A. HARRY LEVY, *Examiners.*

E. E. PORTER, *Assistant Examiner.*